P. L. DONOVAN.
DRAFT BAR.
APPLICATION FILED APR. 18, 1918.
1,308,938.
Patented July 8, 1919.
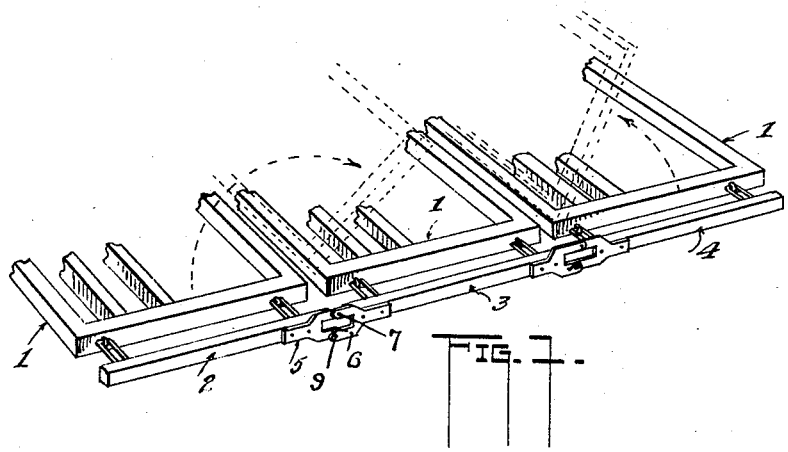
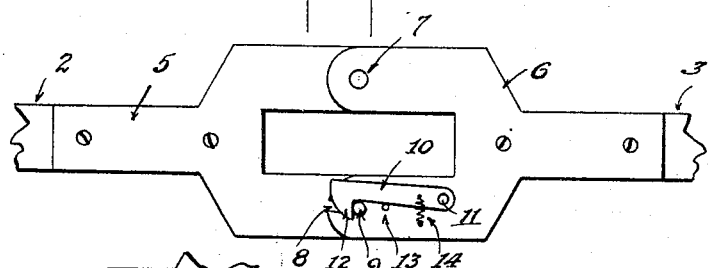
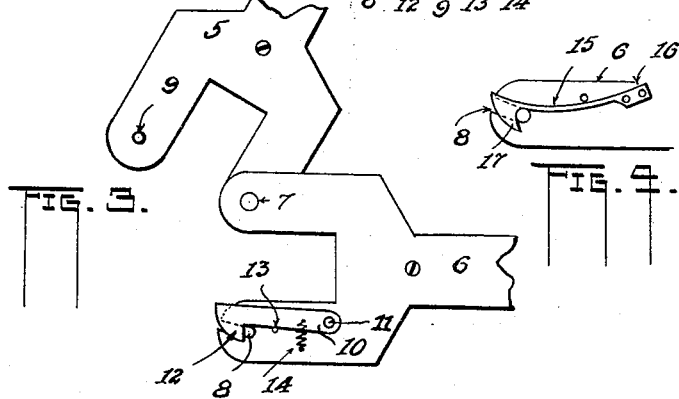
Inventor:
Patrick L. Donovan,

UNITED STATES PATENT OFFICE.

PATRICK L. DONOVAN, OF TOULON, ILLINOIS.

DRAFT-BAR.

1,308,938.   Specification of Letters Patent.   Patented July 8, 1919.

Application filed April 18, 1918. Serial No. 229,388.

*To all whom it may concern:*

Be it known that I, PATRICK L. DONOVAN, a citizen of the United States, residing at Toulon, in the county of Stark and State of Illinois, have invented certain new and useful Improvements in Draft-Bars; and I do hereby declare that the following is a full, clear, and exact description of the invention, which will enable others skilled in the art to which it appertains to make and use the same.

This invention relates to improvements in draft bars for harrows. It relates more particularly to a draft bar of pivotally connected sections and means for automatically locking the sections to constitute a single rigid member.

The object of the invention is to furnish a draft bar that may be folded with the harrow sections when adapting an implement of this type for storage, or for passage through narrow driveways, which draft bar when placed in position for use in the field will be thoroughly rigid throughout.

To the end that the invention may be understood I have provided the accompanying drawing wherein, Figure 1 shows portions of three harrow sections and a draft bar of pivotally connected sections involving my invention.

Fig. 2 is an elevation of portions of two draft bars and an automatic latch for securing them in operative position.

Fig. 3 is a similar view showing the portions swung open.

Fig. 4 indicates a slightly different form of latch from that shown in the other figures.

In some types of harrows it is customary to employ several harrow sections to each of which is attached a section of a draft bar, the said draft bar sections being pivotally connected. In use, by reason of the fact that the draft bar sections are free to move relatively on their pivots, the pull of the draft animals is inclined to lift them as well as the front edges of the harrow sections resulting in an indifferent harrowing operation.

It is my purpose, therefore, to furnish a draft bar that, as stated, can be folded with the harrow sections whenever desired, but whose sections when moved to their operative positions will automatically lock so as to form practically a one-piece rigid bar.

In Fig. 1 the numeral 1 indicates three harrow sections, and 2, 3 and 4 indicate corresponding sections of a draft bar, the sections being linked in any usual manner to the harrow sections. The latter are foldable as indicated by broken lines. That is to say, the two outer sections are foldable upon the middle one and it is always desirable to have the draft bar sections also foldable with them.

Figs. 2 and 3 indicate the manner of pivoting the two adjacent draft bar sections. 5 indicates a Y-shaped plate suitably secured upon the front face of the draft bar section 2 and 6 indicates a similar plate secured upon the section 3. Corresponding arms of the plates 5 and 6 are hingedly connected at 7 while the opposite corresponding arms are arranged to engage one another. That is to say, 8 is a slot in the arm of the plate 6, for example, said slot being substantially an arc struck from the center of the pivoting link at 7, and 9 is a pin extending from the corresponding arm of the plate 5 to enter said slot.

10 is a latch pivoted upon the plate 6, for example, at the point 11, the heel 12 of the latch normally overlying the slot 8.

13 is a limiting stop for the latch and 14 a spring to hold the latter upon said stop. It is thus seen that the said heel 12 is always in the path of the pin 9 and must be engaged by the latter when one of the sections, the section 5 for example, is moved from the position shown in Fig. 3, to that shown in Fig. 2, forcing the latch upward against the pull of the spring 14, said latch following in behind the pin 9 when the latter has reached the limit of its movement where it lies substantially in the bottom of the slot 8.

Fig. 4 is a modification of the latch which is represented by the numeral 15, its end 16 being secured to the plate 6. This latch is in the form of a spring. Its heel, as in the other instance, overlies the slot 8 so as to automatically engage the pin already described. This modification is provided as indicating other methods of providing an automatic lock. It is to be understood that it is merely necessary to move the latch of whatever form may be used so as to release the pin 9 whereupon the sections may be folded over after the manner shown in Fig. 3, the automatic locking resulting when the several sections are placed in line with one another.

Other methods of pivoting together the draft bar sections are possible, together with any desired manner of locking, I merely having showed a preferred manner of so doing.

Having thus described my invention, I claim:—

1. A draft bar consisting of two sections pivotally connected at one of their ends, a pin extending from one of them lying parallel to the axis of the point of pivotal connection of said section and spaced therefrom, and a latch on the other section lying in the path of and adapted to engage the pin when the sections are brought into alinement, said latch having means to hold it elastically in said path.

2. A draft bar consisting of two sections pivotally connected at one of their ends, a pin extending from one of them spaced from the pivot of the sections in a direction substantially perpendicular to the longest measurement of the said section, and a latch normally elastically held in the path of the pin and engaged by said pin when the sections are brought into alinement.

3. A draft bar comprising two sections, a Y-shaped plate secured at the end of one of them, a similarly formed plate at the end of the other section, corresponding arms of the said plates being connected pivotally to one another, a pin carried by the free arm of one of the plates, and a latch carried by the free arm of the other plate adapted to engage and hold the pin for securing the two sections relatively rigid when brought into alinement.

4. A draft bar comprising two sections, a Y-shaped plate secured at the end of one of them, a similarly formed plate at the end of the other section, corresponding arms of said plates being connected pivotally, a pin carried by the free arm of one of the plates, and a spring held latch carried by the free arm of the other plate adapted to receive and hold the pin for maintaining the two said sections in rigid alinement.

In testimony whereof I affix my signature, in presence of two witnesses.

PATRICK L. DONOVAN.

Witnesses:
L. O. EAGLETON,
L. M. THURLOW.

Copies of this patent may be obtained for five cents each, by addressing the "Commissioner of Patents, Washington, D. C."